United States Patent

[11] 3,627,288

| [72] | Inventor | Ward D. MacDonald |
| --- | --- | --- |
| | | North Muskegon, Mich. |
| [21] | Appl. No. | 13,337 |
| [22] | Filed | Feb. 24, 1970 |
| [45] | Patented | Dec. 14, 1971 |
| [73] | Assignee | Michigan Foundry Supply Apparatus |
| | | Muskegon, Mich. |
| | | Original application Jan. 7, 1969, Ser. No. 798,571, now abandoned, which is a division of application Ser. No. 714,364, Mar. 19, 1968, now Patent No. 3,450,529. Divided and this application Feb. 24, 1970, Ser. No. 13,337 |

[54] DEOILING AND BRIQUETTING APPARATUS
7 Claims, 1 Drawing Fig.

[52] U.S. Cl. ............................................. 263/32,
75/63, 110/14, 134/65
[51] Int. Cl. ............................................. F27b 7/00
[50] Field of Search ............................................. 263/32, 33;
110/14; 134/65; 75/63; 266/33 R, 33 S

[56] References Cited
UNITED STATES PATENTS

| 2,092,657 | 9/1937 | Smith | 263/33 |
| --- | --- | --- | --- |
| 2,102,664 | 12/1937 | Alexander, Jr. | 263/33 |
| 2,852,418 | 9/1958 | MacDonald | 110/14 X |
| 2,925,821 | 2/1960 | MacDonald | 110/14 X |

*Primary Examiner*—John J. Camby
*Attorney*—Price, Heneveld, Huizenga & Cooper

ABSTRACT: This disclosure relates to an apparatus for making metal briquettes for foundry operations from oily particulate material. The briquettes are made, for example, from oily metal particles, such as metal turnings, which are fed to a furnace to burn the oil therefrom. In the furnace, the particles are heated to a high temperature of, for example, 1,200° to 1,400° F. The heated and deoiled particles are passed directly to a hopper which feeds the briquetting mechanism. The temperature of the deoiled particles is sensed and is maintained within a predetermined range for briquetting by adjusting the feed to the furnace in accordance with the sensed temperature. The amount of deoiled particles in the feed hopper is controlled to prevent overflow of the feed hopper and to maintain the density of the briquettes by sensing the level of deoiled particles in the feed hopper and adjusting the speed of the briquetting rolls accordingly to maintain the proper level.

PATENTED DEC 14 1971 3,627,288
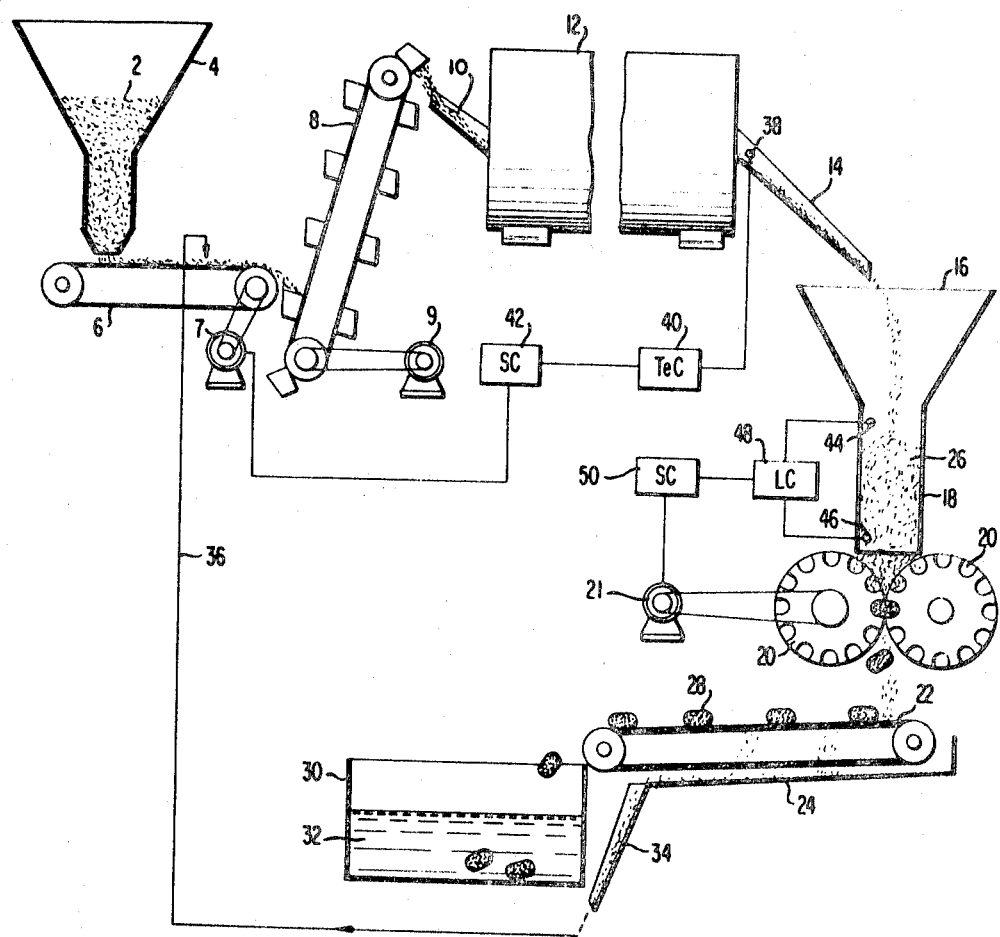
INVENTOR
WARD D. MacDONALD
ATTORNEYS

DEOILING AND BRIQUETTING APPARATUS

This application is a division of Ser. No. 798,571, filed on Jan. 7, 1969, now abandoned which is a division of Ser. No. 714,364, filed on Mar. 19, 1968, now U.S. Pat. No. 3,450,529.

This invention relates to processing of metallic particulate materials. In one of its aspects it relates to a sintering operation for compacting deoiled metal particles, such as turnings, into briquettes where the deoiled particles are fed at a high temperature to a hopper and passed from the hopper through briquetting rolls, wherein the level of particles in the hopper is sensed and the speed of the briquetting rolls is adjusted accordingly to maintain the level of particles within the hopper such that the particles do not overflow the hopper and such that sufficient particles are present in the hopper to adequately feed the briquetting rolls to make high-density metal briquettes.

In another of its aspects, the invention relates to a sintering operation wherein oily metallic particles are fed to a deoiling zone, the particles are heated to a deoiling temperature in the presence of oxygen, and are then fed directly to a briquetting zone wherein the particles are compacted to high-density briquettes, wherein the temperature of the deoiled particles is sensed between the deoiling zone and the briquetting zone, and the amount of oily particles fed to the deoiling zone is adjusted to maintain the temperature of the deoiled particles suitable for hot briquetting.

In still another of its aspects, the invention relates to an apparatus for compacting deoiled metallic particles such as turnings comprising: compacting rolls which form metallic briquettes when particulate metallic material is fed between the rolls as they turn, a feed hopper means aligned with the rolls to feed hot deoiled turnings between the rolls for compacting, means to rotate the compacting rolls, and means to vary the speed of the rolls so that the amount of deoiled metallic particulate material in the hopper can be maintained at a predetermined level, such that sufficient material is fed to the rolls to produce a dense briquette and so that the amount of hot particulate material in the feed hopper will be insufficient to overflow the hopper.

In still another of its aspects, the invention relates to a deoiling apparatus wherein oily metallic material is passed to a deoiling means which is adapted to burn the oil from the metallic material while heating the metallic material to a high temperature, means are provided to sense the temperature of the deoiled material passing from the deoiling means, and means are provided to regulate the amount of oily material fed to the deoiling means in accordance with the sensed temperature such that the temperature of the metallic effluent from the deoiling means is maintained within a predetermined temperature range.

Murphy, in *Iron Age*, June 22, 1967, pp. 65–67, discloses a new process for making dense metal briquettes wherein oily iron borings are heated in a deoiling furnace and passed directly to compacting rolls.

One requirement of this process is that the temperature of the heated metallic material fed to the rolls must be in the range of 1,000° to 1,400° F., preferably in the range of 1,200° to 1,400° F. Deoiling furnaces using an excess of oxygen and in some cases fuel, generally produce hot deoiled metallic material in the range of 1,200° to 1,400° F. However, the oil content of the charge varies, and therefore, the temperature of the deoiled borings passing out of the deoiling furnace will fluctuate. Sometimes, the temperature of the effluent boring from the deoiling furnace will exceed 1,400° F. and in some cases be less than 1,000° F.

I have now discovered that the temperature of metallic material fed to the compacting rolls can be controlled by sensing the temperature of the deoiled borings as they pass from the deoiling furnace and, accordingly, adjusting the speed of the material to the furnace to maintain the temperature within the predetermined range.

When the briquetting rolls are fed from the effluent from the deoiling furnace, the hopper load tends to fluctuate due to the varying amounts of deoiled material fed to the compacting rolls. When the hopper gets too full, the deoiling furnace must be shut down to prevent the hopper from overflowing and in some cases to prevent sintering or fusing together of the deoiled borings in the feed hopper. When the level of deoiled borings becomes too low, for example, below about 500 pounds, the density of the briquettes drops appreciably.

I have now discovered that the density of the briquettes can be maintained at a high level without overflow or sintering in the hopper by sensing the level of metallic material in the hopper and, accordingly, adjusting the speed of the rolls to maintain the proper range of material within the hopper.

By various aspects of this invention one or more of the following, or other, objects can be obtained.

It is an object of this invention to provide an improved process and apparatus for producing high-density metallic briquettes.

It is a further object of this invention to provide an integrated process and apparatus for producing high-density metal briquettes from oily metal borings wherein variation in temperature of feed to the briquetting rolls is minimized.

It is a further object of this invention to provide a method and apparatus for producing high-density metal briquettes wherein overflow of and sintering in the feed hopper to the compacting rolls is eliminated.

It is yet another object of this invention to provide a process and apparatus for producing high-density metal briquettes wherein the propensity to produce low-density metal briquettes due to too little metallic material in the feed hopper is eliminated.

Other aspects, objects, and the several advantages of this invention are apparent to one skilled in the art from a study of this disclosure, the drawings, and the appended claims.

According to the invention, there is provided an operation for compacting deoiled metal particles wherein deoiled particles such as iron turnings and borings are fed to a feed hopper and passed from the hopper through compacting rolls. The level of the hot metal material within the feed hopper is sensed and the speed of the compacting rolls is adjusted accordingly to maintain the level within the feed hopper at a predetermined range such that sufficient turnings are maintained in the hopper to adequately feed the briquetting rolls for making high-density briquettes and to eliminate overflow of the material in the feed hopper.

Further according to the invention, the compacting rolls are fed by the effluent from a deoiling furnace in which the temperature of the effluent from a deoiling furnace is sensed and the amount of material fed to the deoiling furnace is controlled so as to maintain the temperature of the deoiled turnings within a range suitable for briquetting.

With the operation of the invention, automatic or manual controls can be employed for adjusting the speed of the compacting rolls responsive to the level of material in the hopper or the speed of the rolls can be adjusted manually.

Similarly, the control of the feeder device for the deoiling furnace can be done automatically or manually responsive to the sensed temperature of the deoiled turnings.

The invention will now be described with reference to the accompanying drawing in which a schematic embodiment of the invention is shown.

Referring now to the drawing, oily iron turnings or borings 2 are loaded into hopper 4 for processing. The oily iron turnings pass from the lower portion of the hopper 4 onto a conveyor 6 driven by motor 7, and are passed to a bucket conveyor 8 driven by a motor 9. The oily iron turnings in the bucket conveyor are dumped into a feed trough 10 through which the turnings pass to a rotary deoiling furnace 12. The deoiling furnace 12 is of conventional design and is described more fully in my U.S. Pat. Nos. 2,852,418 and 2,925,821. In the deoiling furnace, the iron turnings are heated in the presence of oxygen to a temperature of about 1,200° to 1,300° F.

After the turnings have been deoiled, they pass from the exit end of rotary furnace 12 onto chute 14 and into feed hopper 16.

The deoiled turnings 26 pass from feed hopper 16 through throat 18 and then through briquetting rolls 20 which compress and compact the deoiled turnings into briquettes 28. Each roll 20 has a plurality of pockets which are aligned with pockets on the adjacent roll so that deoiled turnings falling between the rolls 20 will be compacted in the pockets to form briquettes. A screen vibratory conveyor 22 latches the briquettes and immediately passes them into a quench tank 30 containing water 32. The elapse of time between the removal of the briquettes 28 from the briquetting rolls 20 and the quenching in the water tank preferably is the range of 30 seconds to 2 minutes.

A small percentage of the turnings passing through the briquetting rolls are not pressed into briquettes. These turnings will drop through the screen vibratory conveyor 22 onto a collector 24 and will be directed by a chute 34 to a suitable conveyor 36 to be recycled to the vibratory conveyor 6.

For a proper briquetting operation, the deoiled turnings must have a temperature of 1,200° to 1,300° F. The deoiling process in the rotary furnace generally heats the turnings during the deoiling process so that the turnings at the exit end of the furnace are at a temperature in the range of 1,500° F. depending on the amount of oil on the original turnings and the amount of turnings fed into the furnace. According to one embodiment of the invention, the temperature of the turnings at the exit end of the furnace 12 is maintained at about 1,200° to 1,300° F. by sensing the temperature at the exit end of the furnace and controlling the speed at which the oily turnings are fed to the furnace to maintain the predetermined temperature. To this end, a temperature-sensing probe 38 senses the temperature of the deoiled turnings as they leave the furnace 12 and transmits this information to a temperature recorder controller 40 which, in turn, controls a speed controller 42 for motor 7. Accordingly, if the temperature of the deoiled turnings coming out of the furnace 12 is too high, the temperature recorder controller 40 will cause speed controller 42 to reduce the speed of motor 7 to cause fewer oily turnings to be fed to furnace 12. Conversely, if the temperature of the deoiled turnings is too low, the temperature recorder controller 40 will cause the speed controller 42 to speed motor 9 to increase the amount of deoiled turnings fed to the rotary furnace 12.

According to another embodiment of the invention, the deoiled turnings 26 are maintained at a predetermined level in throat 18 of the feed hopper 16. The deoiled turnings are at a temperature in the range of 1,200° to 1,300° F. as they pass from the rotary furnace 12. If too many of these deoiled turnings at 1,200° to 1,300° F. accumulate in the feed hopper 16, the deoiled operation will have to be stopped to prevent overflow of the turnings in the feed hopper 16 conversely if insufficient deoiled turnings are in the throat 18 an insufficient amount of these turnings will be passed to briquetting rolls 20 and the resulting briquettes will have a low density.

To this end, a probe 44 and a probe 46 are provided at different levels of throat 18 of feed hopper 16. These probes are used to indicate the level of turnings within the feed hopper 18. Suitable probes include "Bindicator" probes manufactured by the Bindicator Co. of Detroit. The level of turnings in throat 18 of feed hopper 16 is maintained at a predetermined level, or between certain predetermined points in the feed hopper, by sensing the level of the deoiled turnings 26 in throat 18 and, accordingly, controlling the speed at which the briquetting rolls are turned. Thus, if the level of deoiled turnings 26 in throat 18 rises to or above probe 44, the speed of the briquetting rolls will be increased so as to decrease this level of deoiled turnings. Conversely, in the event that the level of deoiled turnings within the throat 18 falls to or below probe 46, the speed at which the briquetting rolls 20 are turned will be reduced to increase the level within the throat.

To this end, a level controller 48 can be attached to probe 44 and 46. The level controller can control the speed controller 50 attached to motor 21 which drives the briquetting rolls 20.

Thus the invention involves, in a more specific embodiment, maintaining the temperature of the deoiled iron turnings in the feed hopper at about 1,200° to 1,300° F. and maintaining the level within throat 18 at a predetermined level to, on the one hand, maintain at least a minimum value for the density of the briquettes and, on the other hand, to prevent the deoiled turnings from sintering and fusing together within the feed hopper.

The metallic materials can be compacted to make briquettes or similar compressed articles from such materials as iron and steel turnings, copper, aluminum turnings and other particulate metallic material. As used throughout this specification, the term briquette is intended to signify all forms of compressed metal such as sheets, rectangles, etc., as well as the well-known cylindrical shape.

The process and apparatus is especially suitable for compacting particulate iron materials such as results from oily iron borings and turnings.

Generally, for iron borings, the weight of the borings in the feed hopper above the rolls will be at least 500 pounds.

Reasonable variation and modification are possible within the scope of the foregoing disclosure, the drawings, and the appended claims without departing from the spirit of the invention.

The embodiments of the invention in which an exclusive property or privilege is claimed are defined as follows:

1. In a deoiling apparatus wherein
   deoiling means are provided to deoil metal particulate material by heating said oily material to a temperature in the presence of oxygen to burn the oil from said particulate material;
   means are provided to feed oily particulate material to one end of said deoiling means;
   means are provided to remove deoiled particulate material from the other end of said deoiling means;
   the improvement which comprises;
   temperature sensing and indicating means in said removal means to sense the temperature of said deoiled particulate material as it is removed from said deoiling means;
   speed control means on said feeding means so that the rate at which oily particulate material is fed to said deoiling means can be controlled to maintain the temperature of said deoiled material at said removal means within a predetermined range,
   means for receiving and temporarily storing said deoiled material from said removal means, and
   utilization means for accepting and compacting said deoiled material from said receiving and storing means at a rate controlled by the level of said deoiled material present in said receiving and storing means.

2. A deoiling apparatus according to claim 1 further comprising control means operably connecting said speed control means with said temperature-sensing means such that the rate at which oily particulate material is fed to said deoiling means is controlled responsive to the temperature sensed by said temperature-sensing means.

3. Apparatus as defined in claim 1 and further including sensing means in said receiving and storing means for detecting first and second levels of said deoiled material contained therein.

4. Apparatus as defined in claim 3 and further including control circuit means coupled to said first and second level-detecting means for providing a unique control signal for a level detected by said first or said second level detection means.

5. An apparatus as defined in claim 4 and further including variable speed drive means coupled to said control means and to said utilization means and responsive to said control signal from said control circuit means for varying the rate of operation of said utilization means in a manner to maintain a flow of deoiled material from said receiving and temporary storage means into said utilization means which produces uniformly compacted articles.

6. In a deoiling apparatus wherein
deoiling means are provided to deoil metal particulate material by heating said oily material to a temperature in the presence of oxygen to burn the oil from said particulate material;
means are provided to feed oily particulate material to one end of said deoiling means;
means are provided to remove deoiled particulate material from the other end of said deoiling means;
the improvement which comprises;
temperature sensing and indicating means in said removal means to sense the temperature of said deoiled particulate material as it is removed from said deoiling means;
speed control means on said feeding means so that the rate at which oily particulate material is fed to said deoiling means can be controlled to maintain the temperature of said deoiled material at said removal means within a predetermined range, and
further comprising compacting means communicating with said removal means to compact said particles into dense-compacted articles.

7. An apparatus according to claim 6 wherein means are further provided to separate said compacted articles from uncompacted particulate material and means are provided to recycle said uncompacted material to the feed to said deoiling furnace.

* * * * *